US005728744A

United States Patent [19]
Okada et al.

[11] Patent Number: 5,728,744
[45] Date of Patent: Mar. 17, 1998

[54] OLEFIN THERMOPLASTIC ELASTOMER FOAMED PRODUCTS AND PROCESSES FOR PREPARING THE SAME

[75] Inventors: Keiji Okada; Masato Karaiwa; Akira Uchiyama, all of Ichihara, Japan

[73] Assignee: Mitsui Petrochemical Industries, Ltd., Tokyo, Japan

[21] Appl. No.: 754,800

[22] Filed: Nov. 21, 1996

[30] Foreign Application Priority Data

Nov. 22, 1995 [JP] Japan ................................. 7-304661

[51] Int. Cl.$^6$ ........................................... C08J 9/10
[52] U.S. Cl. ........................ 521/95; 521/81; 521/96; 521/134; 521/140; 525/211; 525/232; 525/240
[58] Field of Search ....................... 521/95, 81, 134, 521/140, 96; 525/211, 232, 240

[56] References Cited

U.S. PATENT DOCUMENTS 3,806,558  4/1974  Fischer .
4,247,652  1/1981  Matsuda et al. ........................ 521/95

FOREIGN PATENT DOCUMENTS 4826838   4/1973  Japan .
54-112967 9/1979  Japan .

*Primary Examiner*—Morton Foelak
*Attorney, Agent, or Firm*—Sherman and Shalloway

[57] ABSTRACT

Disclouse is an olefin thermoplastic elastomer foamed product obtained by heating a foamable composition comprising a partially crosslinked thermoplastic elastomer composition (A), a specific olefin plastic (B) and a foaming agent (C) in specific proportions. The partially crosslinked thermoplastic elastomer (A) is obtained by dynamically heat-treating a mixture in the presence of organic peroxide, said mixture comprising specific proportions of a peroxide-crosslinkable copolymer rubber (a), which is a specific ethylene/α-olefin/nonconjugated diene copolymer rubber, and a peroxide-decomposable olefin plastic (b), which is a (co)polymer containing 50 to 100% by mol of an α-olefin of 3 to 20 carbon atoms and has a specific MFR. The olefin plastic (B) is a (co)polymer containing 50 to 100% by mol of an α-olefin of 2 to 20 carbon atoms and has a specific MFR. Also disclosed is a process for preparing the olefin thermoplastic elastomer foamed product. The foamed product of the invention is free from surface roughening caused by defoaming even when an expansion ratio is 2 or more times. Besides, the foamed product is soft to the touch and shows excellent heat resistance and weathering resistance. According to the process of the invention, the foamed product can be prepared through simplified steps with high productivity.

28 Claims, No Drawings

5,728,744

OLEFIN THERMOPLASTIC ELASTOMER FOAMED PRODUCTS AND PROCESSES FOR PREPARING THE SAME

FIELD OF THE INVENTION

The present invention relates to olefin thermoplastic elastomer foamed products which are soft to the touch and have excellent heat resistance, and to processes for preparing the foamed products.

BACKGROUND OF THE INVENTION

As a process for preparing foamed products of elastomer, there is conventionally known a process comprising the steps of kneading a natural or synthetic rubber with a vulcanizing agent and a foaming agent, molding the kneadate into a product of desired shape and heating the molded product to thereby vulcanize and foam the molded product.

According to this process, however, if the rubber is molded into a desired shape by means of continuous extrusion, the step of batchwise kneading the rubber with the compounding ingredients to obtain a kneadate must be carried out prior to the continuous extrusion. Further, in order to facilitate feeding of the kneadate to the extruder, the step of molding the kneadate into a ribbon shape must be carried out prior to the continuous extrusion. Thus, the above process has complicated steps, and the vulcanization and foaming step needs a rather long period of time, resulting in disadvantages in the industrial production.

In order to solve these problems, processes of using flexible olefin plastics, e.g., thermoplastic resins such as an ethylene/vinyl acetate copolymer and low-density polyethylene, have been known. According to the processes of using flexible olefin plastics, the above-mentioned steps are omissible.

However, the flexible olefin plastics are basically inferior to rubbers in the heat resistance, so that the resulting foamed products are greatly restricted in their uses.

Meanwhile, it is known that partially crosslinked compositions formed from olefin copolymer rubbers and olefin plastics, which show intermediate properties between the flexible olefin plastics and the vulcanized rubbers, are employable as the thermoplastic elastomers, as described in, for example, Japanese Patent Laid-Open Publications No. 26838/1973 and No. 112967/1979.

In these thermoplastic elastomers, however, the olefin plastic components are decomposed when dynamically heat-treated in the presence of peroxide to thereby show poor tension in the melting stage. Therefore, the thermoplastic elastomers easily undergo defoaming. Even if a foamed product is obtained, it has an expansion ratio of at most about 1.5 times and suffers from marked surface roughening caused by the defoaming.

Accordingly, development of an olefin thermoplastic elastomer foamed product having an expansion ratio of at least 2 times, being free from surface roughening caused by defoaming, being soft to the touch and showing excellent heat resistance is desired. Also desired is development of a process for preparing the foamed product with high productivity through simplified steps.

OBJECT OF THE INVENTION

The present invention is intended to solve such problems associated with the prior art as described above, and it is an object of the invention to provide an olefin thermoplastic elastomer foamed product being free from surface roughening caused by defoaming even when an expansion ratio of 2 or more times, being soft to the touch and showing excellent heat resistance, and to provide a process for preparing the foamed product with high productivity through simplified steps.

SUMMARY OF THE INVENTION

The olefin thermoplastic elastomer foamed product according to the invention is a foamed product obtained by heating a foamable composition comprising:

[I] 100 parts by weight of a partially crosslinked thermoplastic elastomer composition (A) obtained by dynamically heat-treating a mixture in the presence of organic peroxide, said mixture comprising:

60 to 95 parts by weight of a peroxide-crosslinkable olefin copolymer rubber (a), which is an ethylene/α-olefin copolymer rubber of ethylene and an α-olefin of 3 to 20 carbon atoms or an ethylene/α-olefin/nonconjugated diene copolymer rubber of ethylene, an α-olefin of 3 to 20 carbon atoms and a nonconjugated diene, and 5 to 40 parts by weight of a peroxide-decomposable olefin plastic (b), which is a homopolymer or copolymer containing 50 to 100% by mol of an α-olefin of 3 to 20 carbon atoms and has a melt flow rate (ASTM D 1238-65T, 230° C., load of 2.16 kg) of 5 to 80 g/10 min, the total amount of said components (a) and (b) being 100 parts by weight,

[II] 1 to 20 parts by weight of an olefin plastic (B), which is a homopolymer or copolymer containing 50 to 100% by mol of an α-olefin of 2 to 20 carbon atoms and has a melt flow rate (ASTM D 1238-65T, 230° C., load of 2.16 kg) of 0.01 to 2 g/10 min, and

[III] a foaming agent (C).

The process for preparing an olefin thermoplastic elastomer foamed product according to the invention comprises the steps of heating the foamable composition to be molten and then foaming the molten composition.

In the olefin thermoplastic elastomer foamed product and the process for preparing the foamed product according to the invention, the α-olefin for constituting the ethylene/α-olefin copolymer rubber or the ethylene/α-olefin/nonconjugated diene copolymer rubber, each of which is the peroxide-crosslinkable olefin copolymer rubber (a), is preferably propylene or 1-butene.

The peroxide-decomposable olefin plastic (b) is preferably isotactic polypropylene or a propylene/α-olefin copolymer.

The thermoplastic elastomer composition (A) is preferably a thermoplastic elastomer composition having been heat-treated in the presence of organic peroxide and divinylbenzene so as to be partially crosslinked.

The olefin plastic (B) is preferably isotactic polypropylene or a propylene/α-olefin copolymer.

The content of the foaming agent (C) in the foamable composition is usually 0.5 to 20 parts by weight based on 100 parts by weight of the total of the thermoplastic elastomer composition (A) and the olefin plastic (B).

The olefin thermoplastic elastomer foamed product according to the invention preferably has an expansion ratio of not less than 2 times.

DETAILED DESCRIPTION OF THE INVENTION

The olefin thermoplastic elastomer foamed product and the process for preparing the foamed product according to the invention are described in detail hereinafter.

The olefin thermoplastic elastomer foamed product of the invention is a foamed product obtained by heating a foamable composition comprising a specific, partially crosslinked thermoplastic elastomer composition (A), a specific olefin plastic (B) and a foaming agent (C).

First of all, the components for forming the foamable composition are described.

Thermoplastic Elastomer Composition (A)

The thermoplastic elastomer composition (A) used in the invention is a thermoplastic elastomer composition partially crosslinked (also referred to as "partially crosslinked thermoplastic elastomer composition") and comprises a peroxide-crosslinkable olefin copolymer rubber (a) and a peroxide-decomposable olefin plastic (b).

The partially crosslinked thermoplastic elastomer composition means a thermoplastic elastomer composition wherein a molecular weight-increasing polymer component and a molecular weight-decreasing polymer component are present together. The increase of the molecular weight of the polymer results from predominance of the crosslinking reaction in the competitive reactions of the decomposition reaction and the crosslinking reaction, said competitive reactions occurring when the olefin thermoplastic elastomer is reacted with peroxide under heating, while the decrease of the molecular weight of the polymer results from predominance of the decomposition reaction in such competitive reactions.

Peroxide-crosslinkable Olefin Copolymer Rubber (a)

The peroxide-crosslinkable olefin copolymer rubber (a) used in the invention is an amorphous, random, elastomeric copolymer of ethylene and an α-olefin of 3 to 20 carbon atoms or an amorphous, random, elastomeric copolymer of ethylene, an α-olefin of 3 to 20 carbon atoms and a nonconjugated diene, and is an olefin copolymer rubber which is crosslinked when kneaded under heating so as to have lowered flowability or no flowability. Examples of the olefin copolymer rubbers (a) include:

(1) an ethylene/α-olefin copolymer rubber [ethylene/α-olefin (by mol)=about 90/10 to 50/50], and (2) an ethylene/α-olefin/nonconjugated diene copolymer rubber [ethylene/α-olefin (by mol)=about 90/10 to 50/50].

Examples of the nonconjugated dienes include dicyclopentadiene, 1,4-hexadiene, cyclooctadiene, methylene norbornene and ethylidene norbornene. Of the above copolymer rubbers, preferable are an ethylene/propylene copolymer rubber, an ethylene/propylene/nonconjugated diene copolymer rubber, an ethylene/1-butene copolymer rubber and an ethylene/1-butene/nonconjugated diene copolymer rubber. Among them, an ethylene/propylene/nonconjugated diene copolymer rubber is preferable. Particularly, an ethylene/propylene/ethylidene norbornene copolymer rubber is preferable because it can provide a thermoplastic elastomer foamed product having a moderate crosslinking structure.

The olefin copolymer rubber (a) preferably has a Mooney viscosity [$ML_{1+4}$ (100° C.)] of 10 to 250, particularly 30 to 150.

The olefin copolymer rubber (a) preferably has an iodine value of not more than 25. When the olefin copolymer rubber (a) has an iodine value in this range, a thermoplastic elastomer composition (A), which is partially crosslinked with balance, can be obtained.

The peroxide-crosslinkable olefin copolymer rubber (a) is used in an amount of 60 to 95 parts by weight, preferably 70 to 90 parts by weight, based on 100 parts by weight of the total of the peroxide-crosslinkable olefin copolymer rubber (a) and the peroxide-decomposable olefin plastic (b).

In the present invention, the peroxide-crosslinkable olefin copolymer rubber (a) can be used in combination with other rubbers than the peroxide-crosslinkable olefin copolymer rubber (a), within limits not prejudicial to the objects of the invention. Examples of the other rubbers include diene rubbers, such as styrene/butadiene rubber (SBR), nitrile rubber (NBR) and natural rubber (NR), and silicone rubbers.

Peroxide-decomposable Olefin Plastic (b)

The peroxide-decomposable olefin plastic (b) used in the invention is a homopolymer or copolymer containing 50 to 100% by mol of an α-olefin of 3 to 20 carbon atoms and has such properties that it is thermally decomposed so as to be decreased in the molecular weight when mixed with peroxide and kneaded under heating, to thereby enhance flowability of the resin.

Examples of the olefin plastics (b) include:

(1) a propylene homopolymer, (2) a random copolymer of propylene and not more than 10% by mol of other α-olefin, (3) a block copolymer of propylene and not more than 30% by mol of other α-olefin, (4) a 1-butene homopolymer, (5) a random copolymer of 1-butene and not more than 10% by mol of other α-olefin, (6) a 4-methyl-1-pentene homopolymer, and (7) a random copolymer of 4-methyl-1-pentene and not more than 20% by mol of other α-olefin.

Examples of the α-olefins include ethylene, propylene, 1-butene, 4-methyl-1-pentene, 1-hexene and 1-octene. Of the above olefin plastics (b), preferable are a propylene homopolymer and a propylene/α-olefin copolymer having a propylene content of not less than 50% by mol. Above all, isotactic polypropylene and a propylene/α-olefin copolymer, e.g., a propylene/ethylene copolymer, a propylene/1-butene copolymer, a propylene/1-hexene copolymer or a propylene/4-methyl-1-pentene copolymer, are preferable.

The peroxide-decomposable olefin plastic (b) preferably has a melt flow rate (ASTM D-1238-65T, 230° C., load of 2.16 kg) of 5 to 80 g/10 min, particularly 5 to 20 g/10 min.

The peroxide-decomposable olefin plastic (b) has a function of improving flowability and heat resistance of the resulting composition.

The peroxide-decomposable olefin plastic (b) is used in an amount of 5 to 40 parts by weight, preferably 10 to 30 parts by weight, based on 100 parts by weight of the total of the peroxide-crosslinkable olefin copolymer rubber (a) and the peroxide-decomposable olefin plastic (b). If the peroxide-decomposable olefin plastic (b) is used in this amount, a foamable composition of good flowability capable of providing a foamed product having excellent flexibility can be obtained.

Other Components

The thermoplastic elastomer composition (A) used in the invention may further contain a peroxide-noncrosslinkable rubber-like material (c) in addition to the peroxide-crosslinkable olefin copolymer rubber (a) and the peroxide-decomposable olefin plastic (b).

The peroxide-noncrosslinkable rubber-like material (c) is a hydrocarbon rubber-like material which is not crosslinked and not decreased in the flowability even when it is mixed with peroxide and kneaded under heating. Examples of such materials include polyisobutylene, a butyl rubber, a propylene/ethylene copolymer rubber having a propylene content of not less than 70% by mol and a propylene/1-butene copolymer rubber. Of these, polyisobutylene and a butyl rubber are preferable from the viewpoints of performance and handling properties. Particularly, polyisobutylene and a butyl rubber each having a Mooney viscosity [$ML_{1+4}$ (100° C.)] of not more than 60 are preferable because they can improve flowability of the resulting composition.

In the present invention, the term "crosslink" means a phenomenon that in the competitive reactions of the decomposition reaction and the crosslinking reaction occurring when the polymer is reacted with peroxide under heating, the crosslinking reaction predominates, whereby the apparent molecular weight of the polymer in the composition increases. The term "decompose" means a phenomenon that the decomposition reaction predominates, whereby the apparent molecular weight of the polymer decreases.

The peroxide-noncrosslinkable rubber-like material (c) is used, if necessary, in an amount of 5 to 100 parts by weight, preferably 5 to 30 parts by weight, based on 100 parts by weight of the total of the peroxide-crosslinkable olefin copolymer rubber (a) and the peroxide-decomposable olefin plastic (b).

The thermoplastic elastomer composition (A) used in the invention may furthermore contain a mineral oil type softener (d) in addition to the peroxide-crosslinkable olefin copolymer rubber (a), the peroxide-decomposable olefin plastic (b) and the peroxide-noncrosslinkable rubber-like material (c).

Examples of the mineral oil type softeners (d) include high-boiling petroleum fractions, which are conventionally used for lowering the intermolecular force of rubbers in the rolling process to thereby facilitate the rolling, assisting dispersion of carbon black or white carbon, or decreasing hardness of vulcanized rubbers to increase flexibility. The petroleum fractions are classified into paraffinic type, naphthene type, aromatic type, etc.

The mineral oil type softener (d) is used in an amount of 5 to 100 parts by weight, preferably 5 to 80 parts by weight, more preferably 20 to 40 parts by weight, based on 100 parts by weight of the total of the peroxide-crosslinkable olefin copolymer rubber (a) and the peroxide-decomposable olefin plastic (b). If the mineral oil type softener (d) is used in this amount, the flowability of the foamable composition can be improved without lowering heat resistance and tensile properties of the foamed product.

In the present invention, other softeners than the mineral oil type softener (d) are employable within limits not prejudicial to the objects of the invention. As the optionally employable softeners other than the mineral oil type softener (d), those conventionally used for rubbers are suitable. Examples of such softeners include:

synthetic petroleum materials, such as process oil, lubricating oil, paraffin, liquid paraffin, polyethylene wax, polypropylene wax, petroleum asphalt and vaseline;

coal tars, such as coal tar and coal tar pitch;

fatty oils, such as castor oil, linseed oil, rapeseed oil, soybean oil and coconut oil;

waxes, such as tall oil, beeswax, carnauba wax and lanolin;

fatty acids, such as ricinolic acid, palmitic acid, stearic acid, 12-hydroxystearic acid, montanic acid, oleic acid and erucic acid, or metallic salts of these acids;

synthetic polymer materials, such as petroleum resin, coumarone-indene resin and atactic polypropylene;

ester plasticizers, such as dioctyl phthalate, dioctyl adipate and dioctyl sebacate; and others, such as microcrystalline wax, liquid polybutadiene or its modified or hydrogenated product and liquid thiokol.

Further, to the partially crosslinked thermoplastic elastomer composition (A) used for the invention can be optionally added various known additives, such as heat stabilizer, weathering stabilizer, anti-aging agent, antistatic agent, filler, colorant and lubricant, within limits not prejudicial to the objects of the invention.

Process for Preparing Partially Crosslinked Thermoplastic Elastomer Composition (A)

The partially crosslinked thermoplastic elastomer composition (A) used in the invention can be obtained by dynamically heat-treating a blend of the peroxide-crosslinkable olefin copolymer rubber (a), the peroxide-decomposable olefin plastic (b), and optionally, the peroxide-noncrosslinkable rubber-like material (c), the mineral oil type softener (d), etc., in the presence of organic peroxide.

Examples of the organic peroxides include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl benzoate, tert-butylperoxyisopropyl carbonate, diacetyl peroxide, lauroyl peroxide and tert-butylcumyl peroxide.

Of these, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane and n-butyl-4,4-bis(tert-butylperoxy)valerate are preferable from the viewpoints of odor and scorch stability. Among them, most preferable is 1,3-bis(tert-butylperoxyisopropyl)benzene.

The organic peroxide is used in an amount of 0.05 to 3% by weight, preferably 0.1 to 2% by weight, based on 100% by weight of the total of the peroxide-crosslinkable olefin copolymer rubber (a) and the peroxide-decomposable olefin plastic (b).

In the partial crosslinking treatment with the organic peroxide, there can be added peroxy crosslinking assistants, such as sulfur, p-quinone dioxime, p,p'-dibenzoylquinone dioxime, N-methyl-N-4-dinitrosoaniline, nitrosobenzene, diphenylguanidine and trimethylolpropane-N,N'-m-phenylenedimaleimide; divinylbenzene, triallyl cyanurate; polyfunctional methacrylate monomers, such as ethylene glycol dimethacrylate, diethylene glycol dimethacrylate, polyethylene glycol dimethacrylate, trimethylolpropane trimethacrylate and allyl methacrylate; and polyfunctional vinyl monomers, such as vinyl butyrate and vinyl stearate.

By the use of the above compounds, uniform and mild crosslinking reaction can be expected. Of the above compounds, divinylbenzene is most preferably used in the invention. Divinylbenzene can be easily handled and is compatible with the peroxide-crosslinkable olefin copolymer rubber (a) and the peroxide-decomposable olefin plastic (b), which are major components of the object of the crosslinking treatment. Moreover, divinylbenzene has a function of solubilizing the organic peroxide and serves as a dispersant of the organic peroxide. Hence, a partially crosslinked thermoplastic elastomer composition (A) which exerts homogeneous crosslinking effects when heat-treated and is well-balanced between flowability and other properties can be obtained.

In the present invention, the crosslinking assistant or the polyfunctional vinyl monomer is preferably used in an amount of 0.1 to 3% by weight, particularly 0.3 to 2% by weight, based on the whole object to be crosslinked. When the amount of the crosslinking assistant or the polyfunctional vinyl monomer is in the above-mentioned range, the crosslinking assistant or the polyfunctional vinyl monomer does not remain as the unreacted monomer in the resulting partially crosslinked thermoplastic elastomer composition (A), so that the composition is free from a change of properties caused by heat history in the molding process and shows excellent flowability.

By the term "dynamically heat treating" is meant that the components are kneaded in a molten state.

The dynamic heat treatment is carried out by means of various kneading apparatuses such as an open mixing roll, a closed Banbury mixer, a kneader, a single-screw or twin-screw extruder and a continuous mixer, but it is preferably carried out by means of a closed kneading apparatus. Further, the dynamic heat treatment is conducted preferably in an atmosphere of inert gas such as nitrogen or carbon dioxide gas.

The kneading is desirably carried out at a temperature at which the half-life period of the organic peroxide used is less than 1 minute. The kneading temperature is usually 150° to 280° C., preferably 170° to 240° C., and the kneading time is 1 to 20 minutes, preferably 1 to 5 minutes. The shear force applied in the kneading process is usually 10 to $10^4$ sec$^{-1}$, preferably $10^2$ to $10^4$ sec$^{-1}$, in terms of shear rate.

In the present invention, the above components are preferably mixed and kneaded in the following manner. That is, the peroxide-crosslinkable olefin copolymer rubber (a), the peroxide-decomposable olefin plastic (b), and optionally, the peroxide-noncrosslinkable rubber-like material (c) and the mineral oil type softener (d) are previously mixed, uniformly kneaded and pelletized. Then, the pellets, a solution of organic peroxide in divinylbenzene, and optionally, a crosslinking assistant, a vulcanization accelerator, etc. are uniformly mixed at a temperature of preferably not higher than 50° C. by means of a known kneading machine such as a tumbling blender, a V-blender or a Henschel mixer. Thereafter, the mixture was kneaded under the aforementioned given conditions.

Through the above process, the thermoplastic elastomer (A) wherein the peroxide-crosslinkable olefin copolymer rubber (a) is partially crosslinked is obtained.

By the term "partially crosslinked thermoplastic elastomer composition" used herein is meant that the composition has a gel content, as measured in the below-described manner, of not less than 10% by weight, preferably 20 to 97% by weight, particularly preferably 30 to 97% by weight.

Measurement of Gel Content

A sample of a thermoplastic elastomer composition of 100 g is weighed and cut into fine fragments (size: 0.5 mm×0.5 mm×0.5 mm). In a closed vessel, the sample is immersed in 30 ml of cyclohexane at 23° C. for 48 hours. Then, the sample is taken out, placed on a filter paper and dried at room temperature for not less than 72 hours until a constant weight is reached.

From the weight of the dry residue, the weight of all the cyclohexane-insoluble components (e.g., fibrous filler, filler, pigment) other than the polymer component is subtracted. The obtained value is taken as "corrected final weight (Y)".

On the other hand, from the sample weight, the weight of the cyclohexane-soluble components (e.g., softener) other than the polymer component and the weight of the cyclohexane-insoluble components (e.g., fibrous filler, filler, pigment) are subtracted. The obtained value is taken as "corrected initial weight (X)".

The gel content (content of the cyclohexane-insoluble components) is calculated by the following equation.

Gel content [wt. %]=[corrected final weight (Y)/corrected initial weight (X)]×100

Olefin Plastic (B)

The olefin plastic (B) used in the invention is a homopolymer or copolymer containing 50 to 100% by mol of an α-olefin of 2 to 20 carbon atoms.

Examples of the olefin plastics (B) include:

(1) an ethylene homopolymer (prepared by any of low-pressure and high-pressure processes), (2) a copolymer of ethylene and not more than 10% by mol of other α-olefin or a vinyl monomer such as vinyl acetate or ethyl acrylate, (3) a propylene homopolymer, (4) a random copolymer of propylene and not more than 10% by mol of other α-olefin, (5) a block copolymer of propylene and not more than 30% by mol of other α-olefin, (6) a 1-butene homopolymer, (7) a random copolymer of 1-butene and not more than 10% by mol of other α-olefin, (8) a 4-methyl-1-pentene homopolymer, and (9) a random copolymer of 4-methyl-1-pentene and not more than 20% by mol of other α-olefin.

Examples of the α-olefins include ethylene, propylene, 1-butene, 4-methyl-1-pentene, 1-hexene and 1-octene.

Of the above olefin plastics, particularly preferable are a propylene homopolymer and a propylene/α-olefin copolymer having a propylene content of not less than 50% by mol.

The olefin plastics (B) can be used singly or in combination.

The olefin plastic (B) has a melt flow rate (ASTM D-1238-65T, 230° C., load of 2.16 kg) of preferably 0.01 to 2 g/10 min, more preferably 0.02 to 2 g/10 min.

By the use of the olefin plastic (B) having the above-defined melt flow rate, the melt tension of the resulting foamable composition can be improved and a foamed product having a high expansion ratio can be obtained.

The olefin plastic (B) is used in an amount of 1 to 20 parts by weight, preferably 1 to 10 parts by weight, based on 100 parts by weight of the total of the partially crosslinked thermoplastic elastomer composition (A). If the olefin plastic (B) is used in this amount, a foamed product having excellent flexibility and a high expansion ratio can be obtained.

The present invention is characterized in that the olefin plastic (B) is added after the partially crosslinked thermoplastic elastomer composition (A) is prepared. If the olefin plastic (B) is added to the components (e.g., the peroxide-crosslinkable olefin copolymer rubber (a)) for forming the partially crosslinked elastomer composition (A), then mixed with peroxide and kneaded under heating, the olefin plastic (B) may be thermally decomposed so as to be decreased in the molecular weight or may be crosslinked by heat so as to undergo gelation, though it depends on the kind of the olefin plastic (B) used, and as a result the aimed foamed product cannot be obtained.

Foaming Agent (C)

As the foaming agent (C), organic or inorganic thermal decomposable foaming agents, water, solvents of hydrocarbon type and fleon type, gases such as nitrogen, carbon dioxide, propane and butane, etc. are employable. Of these, the thermal decomposable foaming agents are preferable.

Examples of the thermal decomposable foaming agents include:

inorganic foaming agents, such as sodium hydrogencarbonate, sodium carbonate, ammonium hydrogencarbonate, ammonium carbonate and ammonium nitrite;

nitroso compounds, such as N,N'-dimethyl-N,N'-dinitrosoterephthalamide and N,N'-dinitrosopentamethylenetetraamine;

azo compounds, such as azodicarbonamide, azobisisobutyronitrile, azocyclohexylnitrile, azodiaminobenzene and barium azodicarboxylate;

sulfonylhydrazide compounds, such as benzenesulfonylhydrazide, toluenesulfonylhydrazide, p,p'-oxybis(benzenesulfonylhydrazide) and diphenylsulfone-3,3'-disulfonylhydrazide; and azide compounds, such as calcium azide, 4,4'-diphenyldisulfonylazide and p-toluenesulfonylazide.

The foaming agent (C) is used in an amount of 0.5 to 20 parts by weight, preferably 1 to 10 parts by weight, based on 100 parts by weight of the total of the partially crosslinked thermoplastic elastomer composition (A) and the olefin plastic (B).

A foaming assistant may be added according to necessity. Examples of the foaming assistants include compounds of various metals such as zinc, calcium, lead, iron and barium, organic acids such as salicylic acid, phthalic acid and stearic acid, and urea or its derivatives. The foaming assistant has functions of decreasing a decomposition temperature of the foaming agent, accelerating decomposition of the foaming agent, producing uniform bubbles, etc.

Other Components

In the present invention, to the foamable composition can be added various known additives, such as filler, heat stabilizer, anti-aging agent, weathering stabilizer, antistatic agent, lubricant (e.g., metallic soap and wax), pigment, dye, nucleating agent, flame retarder and anti-blocking agent, within limits not prejudicial to the objects of the invention.

As the fillers, those conventionally used for rubbers are suitable. Examples of such fillers include calcium carbonate, calcium silicate, clay, kaolin, talc, silica, diatomaceous earth, mica powder, asbestos, alumina, barium sulfate, aluminum sulfate, calcium sulfate, magnesium carbonate, molybdenum disulfide, glass fiber, glass balloon, Shirasu balloon, graphite and alumina.

The filler is used in an amount of 0 to 40 parts by weight, preferably 1 to 30 parts by weight, based on 100 parts by weight of the total of the partially crosslinked thermoplastic elastomer composition (A) and the olefin plastic (B).

Examples of the known heat stabilizers, anti-aging agents and weathering stabilizers optionally used include those of phenol type, sulfite type, phenylalkane type, phosphite type and amine type.

Preparation of Olefin Thermoplastic Elastomer Foamed Product

In order to prepare the olefin thermoplastic elastomer foamed product of the invention, a mixture comprising the peroxide-crosslinkable olefin copolymer rubber (a) and the peroxide-decomposable olefin plastic (b) in specific proportions is first dynamically heat-treated in the presence of organic peroxide to obtain the partially crosslinked thermoplastic elastomer composition (A). Details of the process for preparing the composition (A) are described hereinbefore.

Then, the partially crosslinked thermoplastic elastomer composition (A) obtained above is compounded with the olefin plastic (B) and the foaming agent in the aforesaid specific proportions, and if desired, further compounded with a foaming assistant, a wetting agent, etc., to prepare the foamable composition.

The olefin plastic (B) and the foaming agent (C) may be added separately. For example, to the partially-crosslinked thermoplastic elastomer composition (A) can be added first the olefin plastic (B) and then the foaming agent (C), or those components may be added in the reverse order.

If the olefin plastic (B) and/or the foaming agent (C) is added during the preparation of the thermoplastic elastomer composition (A), the aimed foamed product cannot be obtained. Likewise, if the olefin plastic (B) and/or the foaming agent (C) is added during the preparation of the thermoplastic elastomer composition (A), the olefin plastic (B) undergoes decomposition or gelation in the dynamic heat treatment, though it depends on the kind of the olefin plastic (B), and as a result the melting viscosity may greatly differ from that necessary to obtain the aimed foamed product or the foaming agent (C) may be decomposed to cause degassing.

The thermoplastic elastomer composition (A) can be compounded with the olefin plastic (B) and the foaming agent (C) by, for example, kneading pellets of the thermoplastic elastomer composition (A), the olefin plastic (B) and the foaming agent (C) by means of a tumbling blender, a V-blender, a ribbon blender, a Henschel mixer or the like, then if desired, kneading the kneadate by means of an open mixing roll or a closed kneading machine such as a Banbury mixer, an extruder, a kneader or a continuous mixer.

The additives such as weathering stabilizer, heat stabilizer, anti-aging agent and colorant may be added in any of the above stages.

Then, the foamed product is prepared from the above-obtained foamable composition. The foamed product can be prepared by various processes conventionally used to obtain known foamed products, for example, extrusion molding, press molding, injection molding and calendering.

To obtain the foamed product through extrusion molding, for example, the foamable composition is melted in an extruder and then extruded from a die, with foaming the foamable composition; or the composition having been foamed in an extruder is extruded from a die. The resin temperature in the extrusion process is preferably 110° to 250° C.

To obtain the foamed product through press molding, for example, pellets of the foamable composition are injected into a heated mold of a press molding machine, then melted with or without applying a mold pressure, and then foamed. The temperature of the mold is preferably 110° to 250° C.

To obtain the foamed product through injection molding, for example, the foamable composition is melted under heating by means of an injection molding machine and then injected into a mold so that the composition is foamed at the nozzle tip. The resin temperature in the injection process is 110° to 250° C.

In the foamed product obtained by the above-described process of the invention, the peroxide-crosslinkable olefin copolymer rubber (a) is partially crosslinked. Therefore, the foamed product is excellent in elastomeric properties such as heat resistance, tensile properties, flexibility, weathering resistance and impact resilience, and besides it is more suitable for recycling than vulcanized rubbers.

EFFECT OF THE INVENTION

The olefin thermoplastic elastomer foamed product of the invention is free from surface roughening caused by defoaming even when an expansion ratio is 2 or more times. Moreover, the foamed product is soft to the touch and has excellent heat resistance and weathering resistance.

According to the process of the invention, an olefin thermoplastic elastomer foamed product exerting such effects as mentioned above can be prepared with high productivity through simplified steps.

The olefin thermoplastic elastomer foamed product of the invention can be used for automobile parts such as weatherstrip sponges, body panels, steering wheels and side shields; footwear such as shoe soles and sandals; electrical parts such as electrical wire covering materials, connectors and cap plugs; civil engineering materials such as clean water plates and noise protect walls; leisure goods such as golf club grips, baseball bat grips, swimming fins and swimming goggles; and miscellaneous goods such as gaskets, water-proof cloths, garden hoses and belts.

EXAMPLE

The present invention will be further described with reference to the following examples, but it should be construed that the invention is in no way limited to those examples.

In the following examples, preparation of foamed products and evaluation of the basic properties of the foamed products were made in the manner described below.

Test Method (1) Extrusion molding

Tubular foamed products and Flat foamed products were prepared by extrusion molding under the following apparatus conditions.

Molding machine: extruder having a diameter of 40 mmø (available from Toshiba Kikai K.K.)
Maximum temperature of cylinder: 200° C.
Die temperature: 150° C.
Die: straight die
Tubular foamed product: die/core=12.5 mm/10.0 mm
Flat foamed product: lengthwise/crosswise=2 mm/15 mm
Take-up rate: 8 m/min (2) Basic properties The tubular foamed products and the flat foamed products obtained by the above extrusion molding method (1) were each cut into a specimen, and the expansion ratio of the specimen was measured in the following manner. Further, the appearance and touch of the specimen and uniformity of the bubbles were evaluated in the following manner.

(a) Expansion ratio

The density of an unexpanded product, 0.88 g/cm$^3$, was divided by the apparent density of an expanded product (foamed product), and the obtained value was taken as the expansion ratio.

(b) Surface appearance of foamed product (surface texture)

The surface appearance of the foamed products (protrusions and depressions on the surface caused by defoaming) were observed and evaluated based the following five ranks.

5: The surface is almost smooth.

3: Protrusions and depressions are sporadically present on the surface.

1: The surface is markedly roughened because of defoaming.

4: The surface appearance is intermediate between the rank 5 and the rank 3.

2: The surface appearance is intermediate between the rank 3 and the rank 1.

(c) Touch

The tubular foamed products were touched with finger. The foamed product having a vulcanized rubber sponge-like, soft touch was ranked as 5. The foamed product having a resin-like, hard touch was ranked as 1. The foamed product having an intermediate touch between the rank 5 and the rank 1 was ranked as 4, 3 or 2.

(d) Uniformity of bubbles

The cut surfaces of the foamed products were visually observed, and the foamed products were evaluated based on variations in the sizes and shapes of the bubbles.

The foamed product having bubbles with extremely uniform sizes and shapes was ranked as A. The foamed product having bubbles with marked variations in the sizes and shapes, for example, large-sized bubbles formed from some joined bubbles or flat bubbles resulting from degassing, was ranked as D. The foamed product having bubbles with intermediate variations between the rank A and the rank D was ranked as B or C.

EXAMPLE 1

70 Parts by weight of an ethylene/propylene/5-ethylidene-2-norbornene copolymer rubber (a) having an ethylene content of 63% by mol, an iodine value of 13 and a Mooney viscosity [$ML_{1+4}$ (100° C.)] of 100 (hereinafter referred to as "EPDM (a)"), 30 parts by weight of polypropylene (b) having a melt flow rate (ASTM D 1238-65T, 230° C., load of 2.16 kg) of 50 g/10 min and a density of 0.91 g/cm$^3$ (hereinafter referred to as "PP-10 (b)"), 30 parts by weight of a butyl rubber (c) having an unsaturation degree of 0.5% and a Mooney viscosity [$ML_{1+4}$ (100° C.)] of 40 (hereinafter referred to as "IIR (c)") and 50 parts by weight of a naphthene process oil (d) (hereinafter referred to as "oil (d)", trade name: Sunsen 4240, available from Nippon Sun Oil K.K.) were kneaded by a Banbury mixer at 180° C. for 5 minutes in an atmosphere of nitrogen. Then, the kneadate was fed to a sheeting roll, and the resulting sheet was cut with a sheet cutter to prepare pellets.

Subsequently, 180 parts by weight of the pellets and a solution obtained by dissolving 0.3 part by weight of 1,3-bis(tert-butyl-peroxyisopropyl)benzene in 0.5 part by weight of divinylbenzene were blended by a tumbling blender to uniformly coat the surfaces of the pellets with the solution.

Then, the pellets were extruded by an extruder at 210° C. in an atmosphere of nitrogen to perform dynamic heat treatment of the pellets. Thus, a partially crosslinked thermoplastic elastomer composition (A) having a gel content of 32% was obtained.

100 Parts by weight of the partially crosslinked thermoplastic elastomer composition (A), 5 parts by weight of polypropylene (B) having a melt flow rate (ASTM D 1238-65T, 230° C., load of 2.16 kg) of 0.3 g/10 min and a density of 0.91 g/cm$^3$ (hereinafter referred to as "PP-20 (B)") and 1.5 parts by weight of azodicarbonamide (C) were blended by a tumbling blender. Then, the mixture was extrusion molded in accordance with the aforesaid method (1), and the resulting foamed product was evaluated in the aforesaid manner.

The results are set forth in Table 1.

EXAMPLE 2

The procedure of Example 1 was repeated except that 70 parts by weight of an ethylene/propylene copolymer rubber (a) having an ethylene content of 72% by mol and a Mooney viscosity [ML$_{1+4}$ (100° C.)] of 80 (hereinafter referred to as "EPM (a)") was used in place of the EPDM (a). The partially crosslinked thermoplastic elastomer composition (A) thus obtained had a gel content of 35%.

The results are set forth in Table 1.

EXAMPLE 3

The procedure of Example 1 was repeated except that 30 parts by weight of polypropylene (b) having a melt flow rate (ASTM D 1238-65T, 230° C., load of 2.16 kg) of 10 g/10 min and a density of 0.91 g/cm$^3$ (hereinafter referred to as "PP-11 (b)") was used in place of the PP-10 (b). The partially crosslinked thermoplastic elastomer composition (A) thus obtained had a gel content of 34%.

The results are set forth in Table 1.

EXAMPLE 4

The procedure of Example 1 was repeated except that the amounts of the EPDM (a), the PP (b) and the IIR (c) were varied to 85 parts by weight, 15 parts by weight and 0 part by weight, respectively. The partially crosslinked thermoplastic elastomer composition (A) thus obtained had a gel content of 48%.

The results are set forth in Table 1.

EXAMPLE 5

The procedure of Example 1 was repeated except that the amount of the PP-20 (B) was varied to 15 parts by weight.

The results are set forth in Table 1.

EXAMPLE 6

The procedure of Example 1 was repeated except that 5 parts by weight of polypropylene (B) having a melt flow rate (ASTM D 1238-65T, 230° C., load of 2.16 kg) of 1.0 g/10 min and a density of 0.91 g/cm$^3$ (hereinafter referred to as "PP-21 (B)") was used in place of the PP-20 (B).

The results are set forth in Table 1.

EXAMPLE 7

The procedure of Example 1 was repeated except that 1.5 parts by weight of polypropylene (B) having a melt flow rate (ASTM D 1238-65T, 230° C., load of 2.16 kg) of 0.05 g/10 min and a density of 0.91 g/cm$^3$ (hereinafter referred to as "PP-22 (B)") was used in place of 5 parts by weight of the PP-20 (B).

The results are set forth in Table 1.

EXAMPLE 8

The procedure of Example 1 was repeated except that 5 parts by weight of polybutene (B) having a melt flow rate (ASTM D 1238-65T, 230° C., load of 2.16 kg) of 0.2 g/10 min and a density of 0.91 g/cm$^3$ (hereinafter referred to as "PB (B)") was used in place of the PP-20 (B).

The results are set forth in Table 1.

EXAMPLE 9

The procedure of Example 1 was repeated except that 2.0 parts by weight of sodium hydrogencarbonate (C) was used in place of 1.5 parts by weight of the azodicarbonamide (C).

The results are set forth in Table 1.

EXAMPLE 10

The procedure of Example 1 was repeated except that 1.0 part by weight of sodium hydrogencarbonate (C) was used in place of 1.5 parts by weight of the azodicarbonamide (C).

The results are set forth in Table 1.

COMPARATIVE EXAMPLE 1

The procedure of Example 1 was repeated except that the amount of the EPDM (a) and the amount of the PP-10 (b) were each varied to 50 parts by weight. The partially crosslinked thermoplastic elastomer composition thus obtained had a gel content of 23%.

The results are set forth in Table 1.

COMPARATIVE EXAMPLE 2

The procedure of Example 1 was repeated except that 5 parts by weight of polypropylene (B) having a melt flow rate (ASTM D 1238-65T, 230° C., load of 2.16 kg) of 4.0 g/10 min and a density of 0.91 g/cm$^3$ (hereinafter referred to as "PP-23 (B)") was used in place of the PP-20 (B).

The results are set forth in Table 1.

COMPARATIVE EXAMPLE 3

The procedure of Example 1 was repeated except that the PP-20 (B) was not used.

The results are set forth in Table 1.

COMPARATIVE EXAMPLE 4

The procedure of Example 1 was repeated except that the amount of the PP-20 (B) was varied to 30 parts by weight.

The results are set forth in Table 1.

COMPARATIVE EXAMPLE 5

The procedure of Example 1 was repeated except that 5 parts by weight of the PP-20 (B) was added to the mixture prior to the dynamic heat treatment in the preparation of the partially crosslinked thermoplastic elastomer composition (A) and the PP-20 (B) was not used after the preparation of the thermoplastic elastomer composition. The partially crosslinked thermoplastic elastomer composition thus obtained had a gel content of 32%.

The results are set forth in Table 1.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|---|---|
| Compounding (parts by wt) | | | | | | | | | | | | | | | |
| Thermoplastic elastomer composition (A) | | | | | | | | | | | | | | | |
| EPDM (a) | 70 | | 70 | 85 | 70 | 70 | 70 | 70 | 70 | 70 | 50 | 70 | 70 | 70 | 70 |
| EPM (a) | | 70 | | | | | | | | | | | | | |
| PP-10 (b) | 30 | 30 | | 15 | 30 | 30 | 30 | 30 | 30 | 30 | 50 | 30 | 30 | 30 | 30 |
| PP-11 (b) | | | 30 | | | | | | | | | | | | |
| IIR (c) | 30 | 30 | 30 | 30 | | 30 | 30 | 30 | 30 | 30 | 30 | 30 | 30 | 30 | 30 |
| oil (d) | 50 | 50 | 50 | 50 | 50 | 50 | 50 | 50 | 50 | 50 | 50 | 50 | 50 | 50 | 50 |
| Olefin plastic | | | | | | | | | | | | | | | |
| PP-20 (B) | | | | | | | | | | | | | | | 5 |
| Olefin plastic (B) | | | | | | | | | | | | | | | |
| PP-20 (B) | 5 | 5 | 5 | 5 | 15 | | | | 5 | 5 | 5 | | | 30 | |
| PP-21 (B) | | | | | | 5 | | | | | | | | | |
| PP-22 (B) | | | | | | | 1.5 | | | | | | | | |
| PP-23 (B) | | | | | | | | | | | | | 5 | | |
| PB (B) | | | | | | | | 5 | | | | | | | |
| Foaming agent (C) | | | | | | | | | | | | | | | |
| azodicarbonamide (C) | 1.5 | 1.5 | 1.5 | 1.5 | 1.5 | 1.5 | 1.5 | 1.5 | | | 1.5 | 1.5 | 1.5 | 1.5 | 1.5 |
| sodium hydrogencarbonate (C) | | | | | | | | | 2.0 | 1.0 | | | | | |
| Results of evaluation | | | | | | | | | | | | | | | |
| Expansion ratio (times) | 2.6 | 2.3 | 2.5 | 2.7 | 2.9 | 2.0 | 2.5 | 2.2 | 2.3 | 2.1 | 1.6 | 1.4 | 1.4 | 2.2 | 1.5 |
| Surface appearance | 4 | 4 | 5 | 4 | 5 | 3 | 5 | 4 | 4 | 5 | 2 | 2 | 2 | 4 | 2 |
| Touch | 4 | 4 | 4 | 5 | 3 | 3 | 5 | 5 | 4 | 4 | 1 | 2 | 3 | 1 | 3 |
| Uniformity of bubbles | A | B | B | A | A | B | A | B | B | B | D | C | C | B | C |

Remarks: In Comparative Example 5, the PP-20 (B) was introduced into the thermoplastic elastomer composition.

What is claimed is:

1. An olefin thermoplastic elastomer foamed product obtained by heating a foamable composition comprising:

[I] 100 parts by weight of a partially crosslinked thermoplastic elastomer composition (A) obtained by dynamically heat-treating a mixture in the presence of organic peroxide, said mixture comprising:

60 to 95 parts by weight of a peroxide-crosslinkable olefin copolymer rubber (a), which is an ethylene/α-olefin copolymer rubber of ethylene and an α-olefin of 3 to 20 carbon atoms or an ethylene/α-olefin/nonconjugated diene copolymer rubber of ethylene, an α-olefin of 3 to 20 carbon atoms and a nonconjugated diene, and 5 to 40 parts by weight of a peroxide-decomposable olefin plastic (b), which is a homopolymer or copolymer containing 50 to 100% by mol of an α-olefin of 3 to 20 carbon atoms and has a melt flow rate (ASTM D 1238-65T, 230° C., load of 2.16 kg) of 5 to 80 g/10 min, the total amount of said components (a) and (b) being 100 parts by weight,

[II] 1 to 20 parts by weight of an olefin plastic (B), which is a homopolymer or copolymer containing 50 to 100% by mol of an α-olefin of 2 to 20 carbon atoms and has a melt flow rate (ASTM D 1238-65T, 230° C., load of 2.16 kg) of 0.01 to 2 g/10 min, and

[III] a foaming agent (C).

2. The olefin thermoplastic elastomer foamed product as claimed in claim 1, wherein the α-olefin for constituting the ethylene/α-olefin copolymer rubber or the ethylene/α-olefin/nonconjugated diene copolymer rubber, each of which is the peroxide-crosslinkable olefin copolymer rubber (a), is propylene or 1-butene.

3. The olefin thermoplastic elastomer foamed product as claimed in claim 1 or claim 2, wherein the peroxide-decomposable olefin plastic (b) is isotactic polypropylene or a propylene/α-olefin copolymer.

4. The olefin thermoplastic elastomer foamed product as claimed in claim 3, wherein the thermoplastic elastomer composition (A) is a composition having been heat-treated in the presence of organic peroxide and divinylbenzene so as to be partially crosslinked.

5. The olefin thermoplastic elastomer foamed product as claimed in claim 4, wherein the olefin plastic (B) is isotactic polypropylene or a propylene/α-olefin copolymer.

6. The olefin thermoplastic elastomer foamed product as claimed in claim 5, wherein the foaming agent (C) is an organic or inorganic thermal decomposable foaming agent.

7. The olefin thermoplastic elastomer foamed product as claimed in claim 6, wherein the content of the foaming agent (C) in the foamable composition is 0.5 to 20 parts by weight based on 100 parts by weight of the total of the thermoplastic elastomer composition (A) and the olefin plastic (B).

8. The olefin thermoplastic elastomer foamed product as claimed in claim 7, wherein said foamed product has an expansion ratio of not less than 2 times.

9. A process for preparing an olefin thermoplastic elastomer foamed product, comprising the steps of heating a foamable composition to be molten and then foaming the molten composition, wherein the foamable composition comprises:

[I] 100 parts by weight of a partially crosslinked thermoplastic elastomer composition (A) obtained by dynamically heat-treating a mixture in the presence of organic peroxide, said mixture comprising:

60 to 95 parts by weight of a peroxide-crosslinkable olefin copolymer rubber (a), which is an ethylene/α-olefin copolymer rubber of ethylene and an α-olefin of 3 to 20 carbon atoms or an ethylene/α-olefin/nonconjugated diene copolymer rubber of ethylene, an α-olefin of 3 to 20 carbon atoms and a nonconjugated diene, and 5 to 40 parts by weight of a peroxide-decomposable olefin plastic (b), which is a homopolymer or copolymer containing 50 to 100% by mol of an α-olefin of 3 to 20 carbon atoms and has a melt flow rate (ASTM D 1238-65T, 230° C., load of 2.16 kg) of 5 to 80 g/10 min, the total amount of said components (a) and (b) being 100 parts by weight,

[II] 1 to 20 parts by weight of an olefin plastic (B), which is a homopolymer or copolymer containing 50 to 100% by mol of an α-olefin of 2 to 20 carbon atoms and has a melt flow rate (ASTM D 1238-65T, 230° C., load of 2.16 kg) of 0.01 to 2 g/10 min, and

[III] a foaming agent (C).

10. The process as claimed in claim 9, wherein the α-olefin for constituting the ethylene/α-olefin copolymer rubber or the ethylene/α-olefin/nonconjugated diene copolymer rubber, each of which is the peroxide-crosslinkable olefin copolymer rubber (a), is propylene or 1-butene.

11. The process as claimed in claim 9 or claim 10, wherein the peroxide-decomposable olefin plastic (b) is isotactic polypropylene or a propylene/α-olefin copolymer.

12. The process as claimed in claim 11, wherein the thermoplastic elastomer composition (A) is a composition having been heat-treated in the presence of organic peroxide and divinylbenzene so as to be partially crosslinked.

13. The process as claimed in claim 12, wherein the olefin plastic (B) is isotactic polypropylene or a propylene/α-olefin copolymer.

14. The process as claimed in claim 13, wherein the foaming agent (C) is an organic or inorganic thermal decomposable foaming agent.

15. The process as claimed in claim 14, wherein the content of the foaming agent (C) in the foamable composition is 0.5 to 20 parts by weight based on 100 parts by weight of the total of the thermoplastic elastomer composition (A) and the olefin plastic (B).

16. The process as claimed in claim 15, wherein the olefin thermoplastic elastomer foamed product has an expansion ratio of not less than 2 times.

17. The process of claim 9 wherein the olefin plastic (B) is polypropylene having a melt flow rate (ASTM D 1238-65T, 230° C., load 2.16 kg) of about 0.3 g/10 min, and a density of about 0.91 g/cm$^3$.

18. The process of claim 9 wherein the olefin plastic (B) is polypropylene having a melt flow rate (ASTM D 1238-65T, 230° C., load 2.16 kg) of about 1.0 g/10 min, and a density of about 0.91 g/cm$^3$.

19. The process of claim 9 wherein the olefin plastic (B) is polypropylene having a melt flow rate (ASTM D 1238-65T, 230° C., load 2.16 kg) of about 0.05 g/10 min, and a density of about 0.91 g/cm$^3$.

20. The process of claim 9 wherein the olefin plastic (B) is polybutene having a melt flow rate (ASTM D 1238-65T, 230° C., load 2.16 kg) of about 0.2 g/10 min, and a density of about 0.91 g/cm$^3$.

21. The process of claim 9 wherein the olefin plastic (B) is propylene homopolymer or a propylene/α-olefin copolymer having a propylene content of not less than 50% by mol.

22. The process of claim 9 wherein said foamed product has an expansion ratio of not less than 2 times.

23. The foamed product of claim 1 wherein the olefin plastic (B) is polypropylene having a melt flow rate (ASTM D 1238-65T, 230° C., load 2.16 kg) of about 0.3 g/10 min, and a density of about 0.91 g/cm$^3$.

24. The foamed product of claim 1 wherein the olefin plastic (B) is polypropylene having a melt flow rate (ASTM D 1238-65T, 230° C., load 2.16 kg) of about 1.0 g/10 min, and a density of about 0.91 g/cm$^3$.

25. The foamed product of claim 1 wherein the olefin plastic (B) is polypropylene having a melt flow rate (ASTM D 1238-65T, 230° C., load 2.16 kg) of about 0.05 g/10 min, and a density of about 0.91 g/cm$^3$.

26. The foamed product of claim 1 wherein the olefin plastic (B) is polybutene having a melt flow rate (ASTM D 1238-65T, 230° C., load 2.16 kg) of about 0.2 g/10 min, and a density of about 0.91 g/cm$^3$.

27. The foamed product of claim 1 wherein the olefin plastic (B) is propylene homopolymer or a propylene/α-olefin copolymer having a propylene content of not less than 50% by mol.

28. The foamed product of claim 1 having an expansion ratio of not less than 2 times.

* * * * *